No. 649,633.  
W. H. FAUBER.  
TUBULAR FORK CROWN.  
(Application filed Oct. 17, 1898.)  
Patented May 15, 1900.  
(No Model.)
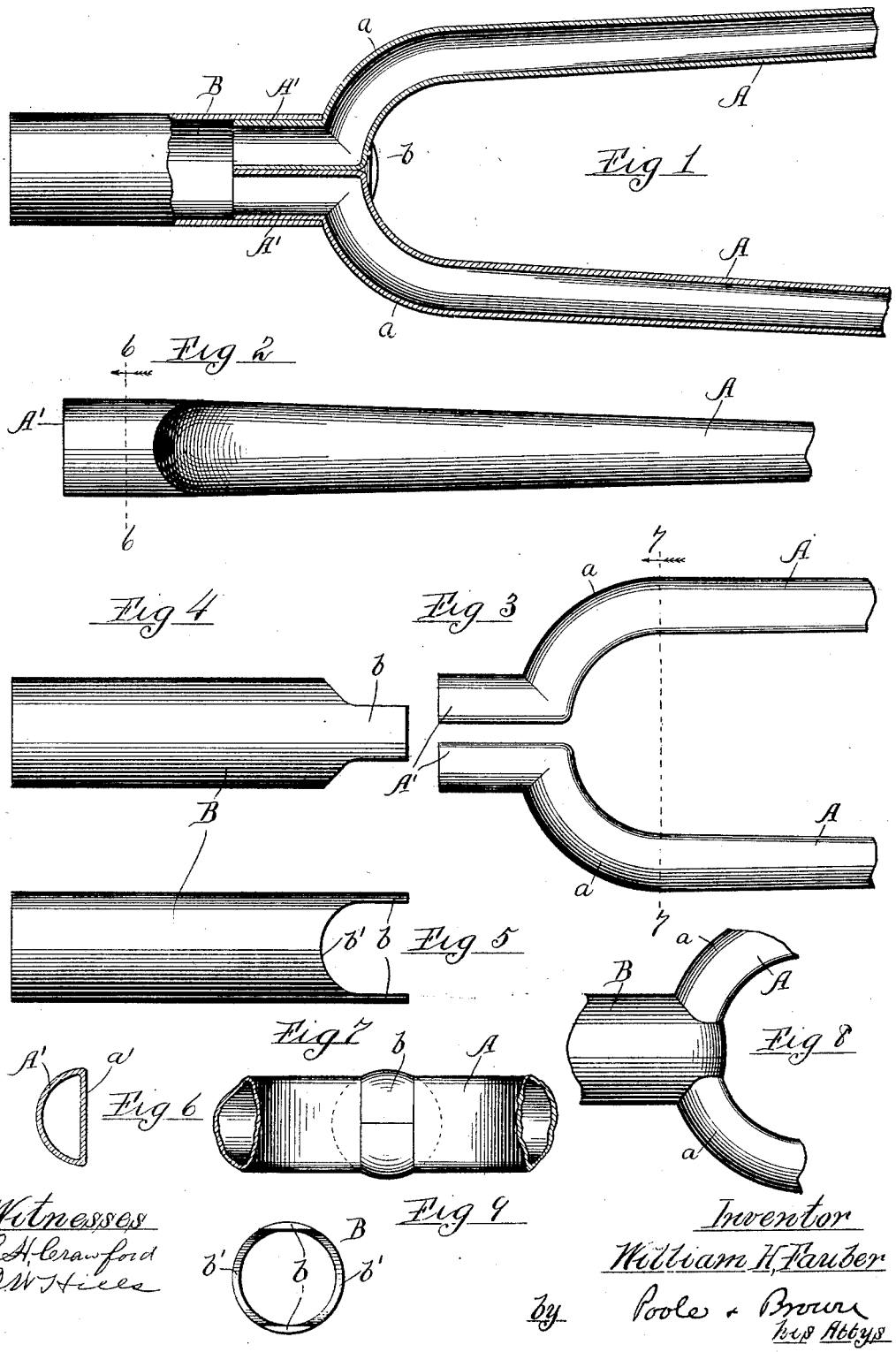

United States Patent Office.

WILLIAM H. FAUBER, OF CHICAGO, ILLINOIS.

TUBULAR-FORK CROWN.

SPECIFICATION forming part of Letters Patent No. 649,633, dated May 15, 1900.

Application filed October 17, 1898. Serial No. 693,756. (No model.)

*To all whom it may concern:*

Be it known that I, WILLIAM H. FAUBER, of Chicago, in the county of Cook and State of Illinois, have invented certain new and useful Improvements in Tubular-Fork Crowns; and I do hereby declare that the following is a full, clear, and exact description thereof, reference being had to the accompanying drawings, and to the letters of reference marked thereon, which form a part of this specification.

This invention relates to an improved construction in forks for bicycle-frames and like tubular structures.

The invention is more especially applicable to the construction of forks for bicycles of that kind which are joined to the hanger or other part of the bicycle-frame by a single frame member—such as the rear fork, which is attached to the hanger-sleeve, or the rear stay-fork, which is attached to the seat-post fitting by a single tube or member and forked at its rear lower ends to form the rear stay-arms.

A fork embodying my invention consists generally of two tubes which are arranged side by side and are long enough to form both the fork sides or arms and a portion of the shank or body of the fork, each tube forming one fork-arm and one-half or a portion of one-half of the shank, and a tube or thimble which fits at one end over the shank portions of the tubes and is permanently attached thereto and is adapted to engage at its other end a thimble on the crank-hanger, seat-post fitting, or other part of the bicycle and forms in connection with the adjacent ends of said fork-tubes the shank of the fork. The said fork-tubes are provided between their ends with double bends by which the parts forming the shank are offset from the parts forming the arms, and the said offset parts are secured to each other side by side, so that they together form a single tubular shank of double structure. Over said offset portions of said tubes is fitted the sleeve or tubular sections, which form, in connection with said offset portions of the tubes, the shank of the fork, said sleeve or tubular section being permanently secured to the fork members by brazing or otherwise and having at its end adjacent to the fork-arms tongues which are bent over and embrace the joint between the parts which form the arms.

The invention consists in the matters hereinafter set forth, and more particularly pointed out in the appended claims.

In the drawings, Figure 1 is a view, partly in plan and partly in section, of a fork constructed in accordance with my invention. Fig. 2 is a side elevation of one of the offset tubes from which a fork embodying my invention is made. Fig. 3 is a plan view of the two fork members after they have been bent to form the offset and ready to be inserted into the shank-sleeve. Figs. 4 and 5 are two views of the shank-sleeve. Fig. 6 is a cross-section taken on line 6 6 of Fig. 2. Fig. 7 is a cross-section taken on line 7 7 of Fig. 3. Fig. 8 is a fragmentary elevation of the parts of the junction of the shank and fork members. Fig. 9 is an end view of the shank-sleeve.

As shown in the drawings, A A indicate fork arms or sides, A' A' the portions of said tubes which together constitute a portion of the fork-shank, and B a tubular section or sleeve which forms with said parts A' the completed fork-shank and which is adapted for engagement at its outer end with a thimble on the part to which the fork is to be connected. The tubes forming the fork sides A A and the shank portions A' A' are provided between their ends with double or reverse bends, as shown at $a$ $a$, and each is provided in the part thereof which forms a portion of the shank with a flat face $a'$, adapted for contact with the corresponding flat face of the other tube in such manner as to give a cylindric or other symmetrical exterior form to the shank portion, said shank being cylindrical, as herein shown. The cylindric section or sleeve B is made of approximately the same or slightly-greater internal diameter than the external diameter of the shank portions A' of the tubes when arranged with their flat faces together and is adapted to be slipped over the offset portions of said tubes and to form, in connection with said offset portions, the shank of the fork. Said parts A' of the fork-tubes are made of a length to extend some distance into the shank-sleeve B when the parts are assembled, so as to form a rigid connection between the same.

In order to more firmly join the shank-sleeve B to the fork-tubes, said sleeve is provided in its end adjacent to said fork-tubes with one or more inwardly-directed extensions b, which when the sleeve has been slipped over the shank portions A' of the fork-tubes in assembling the parts extend inwardly beyond the offset or shank portions and between the side or fork-arms in their parts adjacent to the junction of the same with the shank. Said extensions are adapted to be folded at their extreme ends over the inner curved surface at the offset portion of both fork-arms, so as to cover the meeting edges of said shank portions A', and are brazed or otherwise permanently secured thereto. Preferably two of said extensions b will be provided, one on each side of said sleeve B, and said extensions will extend over and cover the meeting edges of said shank portions both above and below the same. Said extensions will, moreover, be made of such length as to meet or overlap at their inner ends when folded to their final positions. As a preferable manner of accomplishing this result the said sleeve-shank B, which is made from a straight cylindric tube, is provided in one end thereof on diametrically-opposite sides with cut-away portions or notches b', said notches being of such size and shape as to make the rearwardly-directed extension b on the sides of said tubes of considerable width and in position at right angles to said notches. The inner edges of said notches will be preferably made of such shape as to conform to the outer curved surfaces of the fork-tubes in their parts adjacent to the shank portions A', so that when the parts are assembled, as shown in Figs. 1 and 8, a close fit will be formed between said curved inner edges of the notches and the exterior curved surfaces of the fork-arms. Said extension b of the sleeve will preferably be made of such length that when folded together they will meet midway between the sides of the fork and will be made of such shape at their meeting ends as to form a flush joint or connection, as shown in Fig. 7. The extensions b, as well as the sleeve, will be brazed to or otherwise permanently united with the fork members, so that a rigid connection is formed between the same.

In giving shape to the end of the sleeve B, I prefer to employ a cutting-tool the radius of which corresponds with that of the curved portions of the fork-arms and having cutting edges shaped to conform to the cross-sectional shape of the outer surfaces of the fork-arms, so that the notches formed by the cutter, as seen in Figs. 5 and 9, will conform exactly to the exterior shape of the fork-arms, while at the same time sharp or feathered edges will be formed at either side of the extensions b, as clearly seen in Fig. 9. When the sleeve thus made is placed over the shank portions of the fork-arms, the portions of said shank between the projections b will fit accurately and closely around the outer surface of the fork-arms adjacent to the bends therein, while the sharp or feathered edges of the projections b will meet the side faces of the said fork-arms and leave no abrupt surface or shoulders at the sides of said projection. Moreover, when the extremities of the overlapping portions or extensions b are bent into their final positions against the inner surfaces of the fork-arms, as shown in Figs. 7 and 8, the sharp or feathered edges thereof will come in contact with such inner surfaces, so that the said extensions will present smooth and rounded surfaces without any shoulders at their side edges and having convexly-rounded outer faces corresponding with the original curvature of the tube forming the shank, as clearly seen in Fig. 8.

In the manufacture of a fork made as described the tubes constituting the fork-arms will be made from tubular blanks, which will be suitably bent and flattened in their shank portions to give the desired shape, and said tubes will preferably be tapered, as herein shown, in order to afford desirably-proportioned diameters at the shank and arm portions of the fork.

The fork herein shown and described may be made and sold independently as an article of manufacture, and the outer end of the shank-sleeve B when the manufacturer is assembling the frames will be cut away to provide the desired length in the shank. If found desirable, the shank portions A' of the fork members may be extended throughout the greater portion of the length of the sleeve B, so as to abut against the thimble of the part to which the fork is to be attached. Owing to the overlapping construction between the sleeve and the fork members, however, such extension of the shank portions A' of the fork-tubes will not be necessary, thereby enabling the fork as a whole to be lightened, if desired, by making the shank portion relatively short, while at the same time affording a strong and rigid construction.

Fork-crowns have heretofore been constructed of drop-forgings or castings joined by brazed joints to the fork-arms and fork-shank; but crowns thus constructed have the disadvantage of having many joints, of being unduly heavy, and of being expensive to finish, because requiring the grinding and polishing of all the surfaces of the casting or forging forming the crown after the brazing is completed. Fork-crowns have also been made by bending in semicircular form the middle part of a tube which constitutes both of the fork-arms and then attaching to the central part of the curved part a tubular shank by means of outwardly-extending flanges formed on the end of the shank, which flanges overlap and are fitted to the adjacent surface of the crown and secured thereto by brazing. This construction has the disadvantage of necessarily presenting abrupt edges or shoulders around the margins of the flange, thereby making the work of grinding and finishing the parts both difficult and expensive.

Moreover, in such prior construction there are no interfitting parts tending to maintain the fork-arms accurately in position with respect to the shank, so that much care is required to insure the holding of the parts in their proper relative positions during the brazing operation.

A principal advantage arising from the novel construction herein described is that the parts when assembled are brought and held firmly in proper relative position by the construction and formation of the parts, it being obvious that when the shank portions of the fork-arms are inserted in the sleeve B and the extensions $b$ are bent downwardly over or around the said fork-arms the parts will be rigidly and strongly held exactly in their proper positions even before the brazing is accomplished, and no special means, such as riveting or wiring, is required for this purpose. The employment of the extensions $b$, arranged as described, is of very great importance and secures important advantages for the reason that said extensions when secured by brazing to the fork members at both sides of the line of juncture between them form stays which serve to resist strains tending to spread apart the fork-arms, as well as to greatly stiffen and strengthen the structure as a whole. Moreover, it is found that in the act of bending the fork-arms to form the offset portions the metal is made thinner and therefore somewhat weakened, especially at the abrupt bends, where the flattened portions of the shanks join the curved inner surface of the fork-arms, and it will be apparent that the extensions $b$ when brazed to the surfaces beneath them constitute reinforcements of the metal of the fork-arms at these points, said extensions, in fact, overlapping the adjacent parts of the fork-arms and extending over the same to points outside of the angles or bends referred to, so that said extensions serve to strengthen and stiffen the fork-arms for some distance outwardly on either side of the bends referred to. The employment of said extensions therefore gives to a fork-crown made in two pieces a great degree of strength and stiffness at the point at which the two parts forming the fork-crown are joined to each other.

A fork constructed as above described has the advantage of being easily and cheaply made, while at the same time it possesses great strength by reason of the fact that the two pieces which form the shank or body portion and the fork sides are continuous or made in one piece and without joints. The making of the shanks from the joined end portions of the tubes flattened at their meeting faces in the manner described has the advantage of making the shank portion exceedingly strong and rigid, the same being stronger than a single tube of the same size by reason of the double transverse wall formed by the flattened sides of the two tubes.

A further and important advantage gained by the use of the shank-sleeve B, provided with the forwardly-extending projections $b$, is that the joint between the meeting edges of the tubes at the shank or offset portions is covered by said projections and the appearance of the fork as a whole thereby greatly improved. In the practical manufacture of a fork of this general character from sheet metal it is not usually practicable or desirable to make sharp or angular bends where the flat parts join the convex or rounded part of the fork-shanks, so that a groove or depression is formed along the meeting surfaces of the two tubes which requires the use of solder or filling material to give a smooth or continuous surface at the sides of the joined shank portions. Moreover, the joint at the inner side of the fork cannot be so made as to provide a continuous curved surface from one fork to the other without the use of filling material in the groove or depression referred to. In the present construction, however, this part of the fork is completely covered by the extensions $b$ of the shank-sleeve, so that the grooves referred to are entirely concealed and a desirably smooth and finished appearance given thereto.

I claim as my invention—

1. A tubular fork consisting of two tubes bent to form the fork-crown and having offset parts which are bent at an angle to the main parts of the tubes and which are flattened on their inner or contact faces and together form a cylindric shank, a sleeve provided at its inner end with two extensions and which surrounds said shank with its edges between said extensions abutting against the outer surface of the crown at either side of said offset parts, said extensions being bent around the adjacent parts of both tubes where the latter meet at the center of the crown.

2. A tubular fork consisting of two tubes bent to form the fork-crown and having offset parts which are flattened on their inner or contact surfaces and together form a cylindric shank, a sleeve surrounding said shank and provided at its inner end on opposite sides thereof with tongues which are folded over the angular parts of the tubes where the latter are joined at the center of the crown and meet end to end between the side faces of said crown.

3. A tubular fork consisting of two tubes bent to form the fork-crown and having offset parts, which are flattened on their inner or contact surfaces to form a cylindric shank, a sleeve surrounding said shank and provided at its inner end on opposite sides thereof with notches curved to fit the curved outer surfaces of the crown and provided between said notches with extensions which are folded over the angular parts of said tubes where the latter meet at the center of the crown.

4. A tubular fork consisting of two tubes bent to form the fork-crown and having offset parts which are flattened on their inner or contact surfaces to form a cylindric shank, a sleeve surrounding said shank and provided at its inner end with notches curved to fit the curved outer surfaces of the fork-crown, and having between said notches extensions, the inner faces of which are made flat to form feather-edges at the sides of the extensions, said extensions being bent over the angular parts of the tubes, where the latter meet at the center of the crown with their flat faces in contact with said tubes.

In testimony that I claim the foregoing as my invention I affix my signature, in presence of two witnesses, this 24th day of September, A. D. 1898.

WILLIAM H. FAUBER.

Witnesses:
WILLIAM L. HALL,
CHARLES W. HILLS.